(12) United States Patent
Kortum et al.

(10) Patent No.: US 7,617,457 B2
(45) Date of Patent: Nov. 10, 2009

(54) SYSTEM AND METHOD FOR COLLABORATIVE CALL MANAGEMENT

(75) Inventors: Philip T. Kortum, Austin, TX (US); P. David White, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 669 days.

(21) Appl. No.: 10/753,097

(22) Filed: Jan. 7, 2004

(65) Prior Publication Data

US 2005/0149876 A1      Jul. 7, 2005

(51) Int. Cl.
G06F 3/00 (2006.01)
(52) U.S. Cl. .............. 715/753; 715/751; 715/755; 715/758; 715/759; 370/260; 370/261; 370/262; 709/204
(58) Field of Classification Search .......... 715/753, 715/751, 755, 756, 757, 758, 759, 733; 709/204; 370/260, 261, 262
See application file for complete search history.

(56) References Cited

U.S. PATENT DOCUMENTS

| | | | |
|---|---|---|---|
| 5,323,444 A | | 6/1994 | Ertz et al. |
| 5,363,507 A | * | 11/1994 | Nakayama et al. .......... 715/743 |
| 5,379,337 A | | 1/1995 | Castillo et al. |
| 5,448,630 A | | 9/1995 | Barstow |
| 5,559,875 A | * | 9/1996 | Bieselin et al. ......... 379/202.01 |
| 5,572,728 A | * | 11/1996 | Tada et al. ................. 707/200 |
| 5,619,555 A | * | 4/1997 | Fenton et al. ............. 379/88.11 |
| 5,859,663 A | * | 1/1999 | Simon ..................... 348/14.07 |
| 5,916,302 A | * | 6/1999 | Dunn et al. ................. 709/204 |
| 6,134,235 A | * | 10/2000 | Goldman et al. ............ 370/352 |
| 6,148,068 A | * | 11/2000 | Lowery et al. ......... 379/202.01 |
| 6,154,465 A | * | 11/2000 | Pickett ..................... 370/466 |
| 6,192,118 B1 | * | 2/2001 | Bayless et al. ......... 379/201.01 |
| 6,324,271 B1 | * | 11/2001 | Sawyer et al. .......... 379/142.05 |
| 6,418,214 B1 | * | 7/2002 | Smythe et al. ......... 379/202.01 |
| 6,457,043 B1 | * | 9/2002 | Kwak et al. ................. 709/204 |
| 6,560,222 B1 | | 5/2003 | Pounds et al. |
| 6,584,490 B1 | | 6/2003 | Schuster et al. |
| 6,611,533 B1 | | 8/2003 | Liao et al. |
| 6,636,242 B2 | | 10/2003 | Bowman-Amuah |
| 6,640,249 B1 | | 10/2003 | Bowman-Amuah |
| 6,690,929 B1 | | 2/2004 | Yeh |
| 6,707,889 B1 | | 3/2004 | Saylor et al. |
| 6,714,635 B1 | | 3/2004 | Adams et al. |
| 6,738,616 B1 | | 5/2004 | Link, II et al. |
| 6,748,054 B1 | | 6/2004 | Gross et al. |
| 6,748,057 B2 | | 6/2004 | Ranalli et al. |
| 6,748,062 B2 | | 6/2004 | Alcott et al. |

(Continued)

Primary Examiner—Weilun Lo
Assistant Examiner—Rashedul Hassan
(74) Attorney, Agent, or Firm—Toler Law Group

(57) ABSTRACT

A system and method for collaborative call management are disclosed. In one embodiment of a method incorporating teachings of the present disclosure, a graphical user interface (GUI) element may be presented in connection with a collaborative call. The GUI element may display a listing of call participants and a status of each participant. Example participant states may include an on-call state, an off-call state, a currently speaking state, a waiting to speak state, and a paused-call state. In operation, information presented in the GUI element may change in response to a status change of a call participant. The method may also involve recognizing that a caller has joined the collaborative call and updating the GUI element to add the joining caller to the list of participants.

37 Claims, 2 Drawing Sheets

U.S. PATENT DOCUMENTS

| | | |
|---|---|---|
| 6,748,318 B1 | 6/2004 | Jones |
| 6,754,323 B1 | 6/2004 | Chang et al. |
| 6,768,788 B1 | 7/2004 | Langseth et al. |
| 7,010,107 B1 * | 3/2006 | Lee et al. ............... 379/202.01 |
| 2002/0087592 A1 * | 7/2002 | Ghani ........................ 707/500 |
| 2003/0158900 A1 * | 8/2003 | Santos ........................ 709/205 |
| 2003/0169291 A1 * | 9/2003 | Nakata et al. ............... 345/753 |
| 2004/0047461 A1 * | 3/2004 | Weisman et al. ........ 379/202.01 |
| 2005/0015444 A1 * | 1/2005 | Rambo ........................ 709/204 |

* cited by examiner

SYSTEM AND METHOD FOR COLLABORATIVE CALL MANAGEMENT

FIELD OF THE DISCLOSURE

The present disclosure relates to conference calling, and more particularly to a system and method for collaborative call management.

BACKGROUND OF THE DISCLOSURE

Technical advances in recent years have made videoconferencing and teleconferencing a cost effective and increasingly wide spread alternative to physical face-to-face meetings. In light of the increasing costs of travel and some safety concerns, enterprises and individuals conduct more and more of their business in a virtual manner. In a typical videoconference or teleconference experience, a participant transmits and receives audio and video signals to and from the other participants. While convenient, conventional conferencing solutions have several shortcomings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Businesses and individuals continue to gravitate towards virtual meetings. In a face-to-face or non-virtual meeting, participants know who is physically present and who is speaking at any given moment. A meeting organizer or host does not need to pause the meeting to let the group know every time the person speaking changes. Moreover, in a face-to-face meeting, it is relatively easy to track the comings and goings of those involved. If some participants excuse themselves from the meeting, the remaining participants know this and also know when those same participants return or new participants join the meeting. The meeting does not need to be stopped or interrupted every time someone exits the meeting or joins the meeting. Many of these characteristics are not currently present in most virtual meetings.

A system and method for collaborative call management are disclosed herein. In one embodiment of a method incorporating teachings of the present disclosure, a graphical user interface (GUI) element may be presented in connection with a collaborative call. The GUI element may display a listing of call participants and a status of each participant. Example participant states may include an on-call state, an off-call state, a currently speaking state, a waiting to speak state, and a paused-call state. In operation, information presented in the GUI element may change in response to a status change of a call participant. In another embodiment, the method may involve recognizing that a caller has joined the collaborative call and updating the GUI element to add the joining caller to the list of participants.

Figure 1:
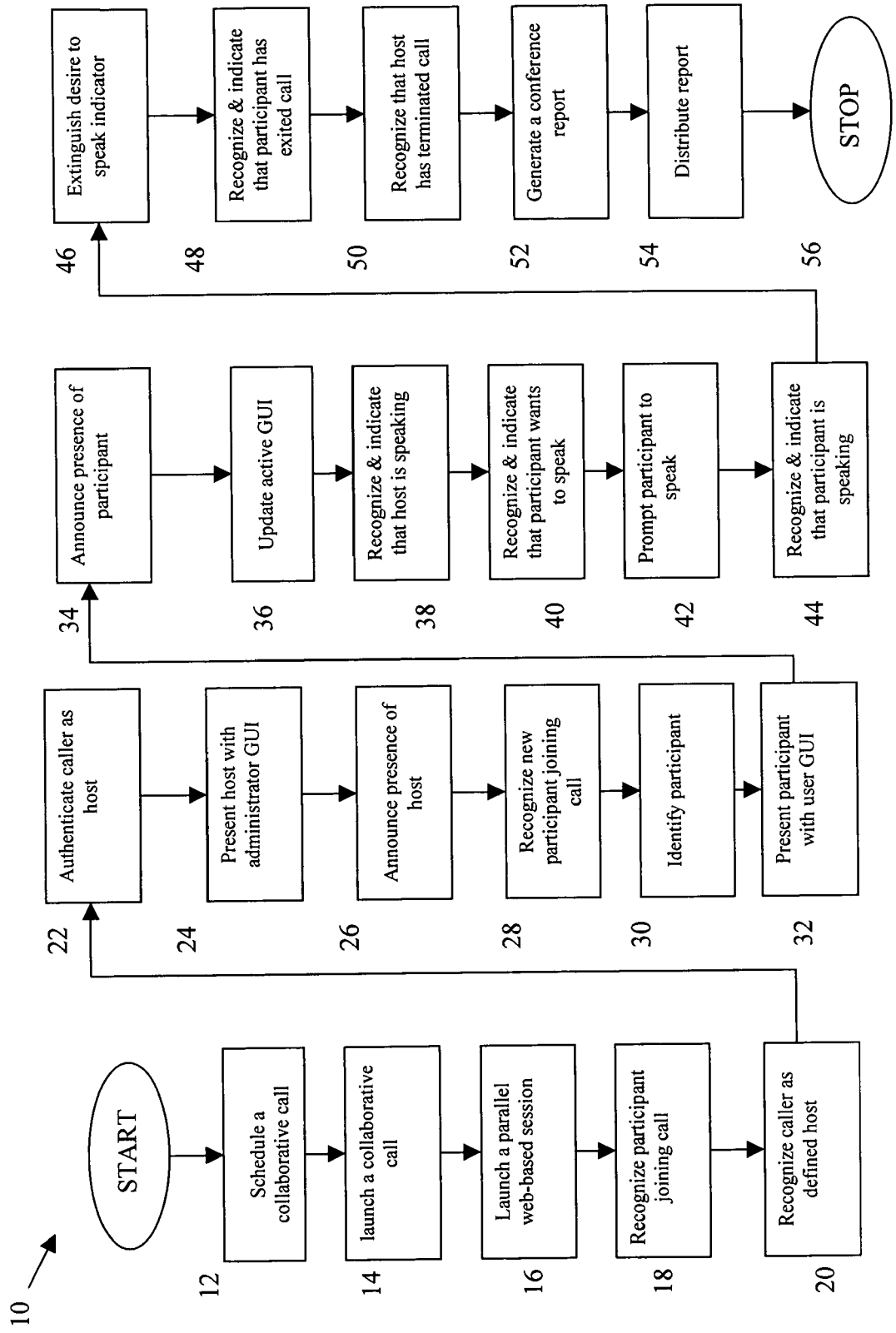
FIG. 1 presents a flow diagram for employing collaborative call management techniques in accordance with the teachings of the present disclosure.

As mentioned above, FIG. 1 presents a flow diagram for a collaborative call management technique 10 that employs teachings of the present disclosure. Technique 10 of FIG. 1 may begin at step 12, where a call is scheduled. The scheduling may occur in several different ways. For example, the scheduling may occur in connection with a software program like Microsoft Outlook or NetMeeting. It may also result from an organizer or host "setting up" the call. The host may populate fields in a template or web-based form indicating who the intended participants are, when the call will take place, how the call will take place, special features of the call, some other call characteristics, and/or a combination thereof.

At step 14, a portion of a collaborative call may be launched. In some embodiments, this may occur automatically or in response to some cue. It may involve one or more connection types. For example, this part of the call may involve a voice telephony session facilitated by a bridge, a Voice over Internet Protocol (VoIP) session, or some other mechanism operable to facilitate communication of voice signals. The collaborative call portion may also make use of videoconferencing equipment and/or videoconferencing software.

At step 16, a parallel session may be launched in connection with the step 14 session. The parallel session may, for example, include a web-session that presents Graphical User Interfaces (GUIs) on devices associated with call participants. In some embodiments, a single platform may support both the parallel session and an audio/video portion like the one referenced above with regard to step 14. At step 18, a participant may join the collaborative call. A system supporting the collaborative call may recognize the participant as the defined host of the call at step 20. This identification may involve the use of voice identification software. For example, a platform may "know" the hosts voice and recognize that voice when the participant joins the call. "Knowing" may involve storing a voice signature file. The platform may identify the caller by comparing a voice signal of the participant to the stored file. The identification may also involve using a Caller Identification (Caller ID) service that recognizes the telephone number or address of a calling party.

In some embodiments, the host of a collaborative call may have certain administrative rights and may be presented with a different GUI that provides some advanced set of call controls. In light of the potential control afforded the host, a system incorporating teachings of the present disclosure may elect to use some rights management technique. For example, the system may employ a security engine, which could include an authentication engine and an authorization engine. The authentication engine may be able to compare an initial set of credentials received from the remote host against a maintained set of credentials. The credentials may include, for example, a user name and password combination. If the received credentials match the maintained credentials, the authorization engine may at step 22 grant host access to the authenticated host.

At step 24, the host may be presented with an administrative GUI having some advanced call controls. At step 26, a system executing some portion of technique 10 may announce the presence of the host on the call. The announcement could be, for example, an audible announcement played over the call. It may also be a graphical and/or textual announcement presented within the administrative GUI and/or other GUIs presented to other call participants.

At step 28, a new caller or participant may have attempted to join the collaborative call. The new user may be "calling into" the collaborative call from a computer, a telephone, a wireless telephone and/or personal digital assistant, and/or some other device capable of facilitating the caller's participation in the collaborative call. At step 30, the caller may be identified and at step 32 presented with a participant GUI, which may be different than the administrative GUI. In some embodiments, a system initiating presentation of the participant GUI may push a GUI element to a device associated with the participant in a format acceptable to the device. For example, if the user is calling in with a cellular telephone having a limited display screen, the GUI element may be formatted or re-formattable for easy display on the small screen.

At step 34, the participant may be announced to the call and at step 36 deployed GUI elements may be updated to indicate that a new caller has joined the call. For example, GUI elements presented on devices associated with call participants may include a list of on-call participants. As callers are added and/or removed from the call, the list may be updated on the deployed GUIs to indicate this change in caller status.

At step 38, the host may begin speaking and a system supporting technique 10 may recognize this and provide an indication to other call participants. The system may recognize that the host is speaking through voice identification, an in-use state of the host's communication link, a speaker initiated indicator, and/or some other technique. The "host is speaking" indication may involve an audible announcement played over the call, a currently speaking indicator within deployed GUI elements, and/or some other technique.

At step 40, a call participant may have indicated a desire to speak. Perhaps the caller depressed a keyboard key, selected a GUI icon, vocalized a desire, and/or provided some other indication. In effect, the indication may be akin to raising one's hand. As a result, one or more of the deployed GUI elements may be updated to include an on-screen indicator of the participant's desire to speak. At step 42, the system, the host, or another participant may prompt the participant to speak.

The system, at step 44, may recognize that the participant is speaking or communicating information via the collaborative call. In some embodiments, the deployed GUI elements may be updated to indicate who is speaking. At step 46, the GUI elements may also be updated to extinguish the desire to speak indicator associated with the participant. In effect, the system may have recognized that a given participant wanted to talk, may have recognized that the given participant had subsequently begun to talk, may have assumed that the given participant had spoken her mind, and may have resultingly removed the desire to speak indicator for the given participant.

At step 48, a system may recognize that at least one of the participants has left the collaborative call and indicate the participant's exit. The exit may be indicated, for example, on the deployed GUI elements, in an audible message played over the collaborative call, and/or in some other fashion. At step 50, the host may exit or terminate the call. The system may recognize this occurrence and tear down the collaborative call session. For example, a conference call bridge or video conferencing session may be brought to an end. In addition, a parallel web-based session may be concluded.

At step 52, a collaborative call report may be generated. The report may include several types of information. The report may include, for example, a list of participants, a time-in and time-out for the participants, a transcript of the call, a to do list for at least one participant of the call, and/or other information implicated by the call. In some embodiments, a system supporting some portion of technique 10 may include an organizing and/or communication-related software package. As such, an example system may be able to populate an Outlook calendar of a call participant, add a task to a participant's electronic to do list, and/or communicate a copy of the report to one or more call participants. As shown at step 54, the report may be distributed, and this distribution may occur, for example, via an electronic mail program, an Instant Messaging program, a wireless messaging service, and/or some other appropriate delivery mechanism. Technique 10 may progress to stop at step 56.

In practice, a collaborative call system employing a technique like technique 10 may operate at a remote server or computing platform that executes instructions that effectuate technique 10. In such a system, the remote computing platform may include a computer-readable medium containing computer-readable instructions capable of instructing the platform to initiate presentation of a host graphical user interface (GUI) in connection with a collaborative call. A computer-readable medium may include any one, several, or all of the following, but is not limited to the following: disk chive memory storage, Read Only Memory (ROM), flash memory, portable storage memory including compact disk (CD), digital video disk (DVD), other portable non-volatile and volatile storage media, random access memory (RAM), non-portable non-volatile storage media and non-portable volatile storage media. The host GUI may include an administrator icon and a listing of call participants. The instructions may also cause the platform to initiate presentation of a participant GUI having an appearance different than the host GUI and to update information presented in the host GUI in response to a status change of a call participant. Caller status may include, for example, an on-call state, an off-call state, a currently speaking state, a waiting to speak state, a paused-call state, or some other state.

The remote computing platform may also be able to cause an updating of a participant GUI and to generate a transcript of the collaborative call and to initiate communication of the transcript to at least one call participant. In some embodiments, various pieces of information including the participant list, the status indicators, and the transcript may be present in a format that allows for display within a GUI. The GUI may be interactive. It may also be presented in a non-interactive mode. For example, the GUI may merely present information and not accept inputs from a user viewing the GUI.

As mentioned above, FIG. 2 shows one embodiment of a system 58 and graphical user interface (GUI) 60 that incorporate teachings of the present disclosure to facilitate collaborative call management. GUI 60 may be presented within a display associated with an access device 62. GUI 60 may include a browser bar portion 64 and a display portion 66. Display portion 66 may contain several active elements 68, 70, and 72.

As shown, element 68 may present a window that includes the name of the person currently speaking on the collaborative call. The speaker may be identified in a number of different ways. System 58 may "know" which telephone line is associated with each user, may recognize that a given line is active, and may determine that the user associated with that line is the speaker. System 58 may also employ a voice recognition or voice identification capability to determine who is speaking. A person may begin speaking, and system 58 and/or some component of system 58 may "recognize" the voice of the speaker. As such, system 58 may be capable of automatically identifying speakers—obviating the need for each speaker to perform an unnatural identification step like striking an "I'm speaking key" or making an awkward introductory statement like "This is Denise and I think . . . " each time a given user wants to be add something to the session.

As shown, a participant name may be presented as a selectable link. Selecting the name "Denise" for example may cause another element to launch, and the new element may include additional information about Denise like her job title, contact information, etc. Element 70 may be presenting a near-real time transcript or chat window for the collaborative call. As depicted in element 70, Frank may have recently finished speaking, and Denise may have taken over. Element 72 may present a user with additional information about the collaborative call. As shown, element 72 includes the current time, the name of the call host, and a list of call participants—including the time in and time out for each of the participants. Also included in element 72 is a small triangle near the name "Scott". The triangle may indicate that Scott would like to speak and has effectively raised his hand to go next.

The items displayed in display portion 66 may represent a "host view" GUI. In some embodiments, a host may be presented with a GUI having administrative and/or additional features when compared to a GUI presented to other participants. For example, participant GUIs may not include the waiting to speak triangle icon. Participant GUIs may also lack the terminate call icon 74. Icon 74 may allow the host to end the collaborative call unilaterally. The host may not want other participants to have access to such a feature.

As depicted, device 62 may be communicatively coupled to a broader network 76 via network interface 78. Network 76 may be, for example, a private network, an intranet, a public telephone network, a cable service provider network, a packet switched network, an Internet Protocol network, and/or some other network capable of allowing the communication of information. In preferred embodiments, network 76 may include the Public Internet.

During a collaborative call, other participants may join via different types of networks and connections using different types of devices. For example, one user may call in across the Public Switched Telephone Network (PSTN) using telephone station 80. Another participant may call in from a wireless device 82 using radio frequency (RF) communications 84. For example, device 82 may communicate using a wide area wireless transceiver. Device 82 could also use a short or local area wireless transceiver to communicate with network 76. As shown, another user may access network 76 and the collaborative call from a computer 86.

In one embodiment of a system incorporating teachings of the present disclosure, an access device like device 62 may be executing various engines that manage and maintain the collaborative call. Device 62 may include, for example, a participant status engine 88 that tracks a caller status for at least one participant of the collaborative call. Device 62 may also include a presentation engine 90 that initiates presentation of a host GUI on device 62 and a different GUI on remote participant stations like computer 86. Device 62 may also include a communication engine 92 that initiates communication of a call report to remote stations in response to completion of the collaborative call. In some embodiments, device 62 may include an update engine that initiates an updating of the host GUI and the participant GUIs in response to a status change of a participant.

Though the engines are depicted as being associated with device 62, one or more of the engines may be operating at a remote collaborative call server 96. In effect, server 96 may support at least a portion of the collaborative call as a network service. Server 96 may be communicatively coupled to a repository 98 maintaining information related to a given call or call participant. Server 96 may act as a web server and a portion of the collaborative call supported by server 96 may be offered as a web session. As such, server 96 may include an interface that allows server 96 to be communicatively coupled to a remote host station like device 62 and a remote participant station like computer 86. Server 96 may also include other interfaces. For example, server 96 may have an Interactive Voice Response (IVR) unit that allows participants to access information associated with the collaborative call via a voice telephone call.

Server 96 may include additional features as well. For example, server 96 may include a Voice over Internet Protocol (VoIP) interface to facilitate the receipt of VoIP calls. Server 96 may also have a next to speak engine that may recognize when a given participant has indicated a desire to speak. The next to speak engine may also be able to initiate an updating of deployed GUIs to make other participants aware of a given user's desire to speak. For example, the deployed GUIs may include an indicator next to a participant's name like the triangle of element 72.

Server 96 and/or some other component of a system like system 58 may also facilitate presentation of a collaborative session window 100. As such, a user may be presented with a great deal of information on a single display device. A user may be able to view all or at least one aspect of the collaborative session in window 100, which may be for example an image associated with a video conference or a document being reviewed, while maintaining access to other session related information.

Figure 2:
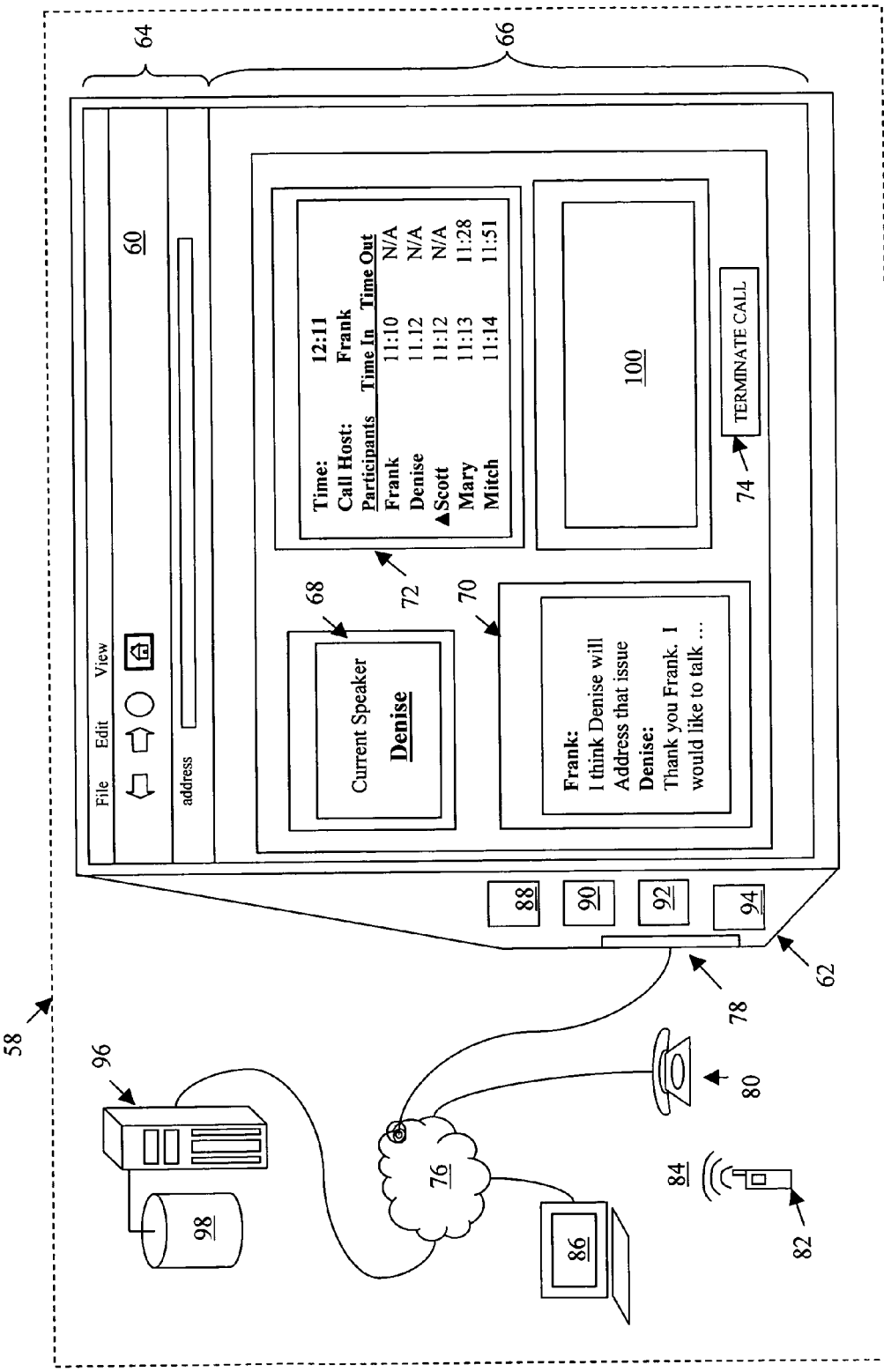
FIG. 2 shows one embodiment of a graphical user interface and system that incorporate teachings of the present disclosure to facilitate collaborative call management.

As shown in FIG. 2, more than one element and/or window may be depicted in a display. In some embodiments, a user may have the ability to modify and/or customize the display. The various windows and elements may be moved, resized, minimized, maximized, closed, opened, launched, and/or otherwise modified to suit the tastes of a given user. Many of the above techniques may be provided by a computing device executing one or more software applications or engines. The software may be executing on a single computing platform or more than one. The platforms may be highly capable workstations, personal computers, microprocessors, servers, or other devices capable of performing the techniques. It will be apparent to those skilled in the art that the disclosed embodiments may be modified in numerous ways and may assume many embodiments other than the particular forms specifically set out and described herein.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A collaborative call method comprising:
    initiating presentation of a graphical user interface (GUI) element by a presentation engine to a device associated with a caller joining in a collaborative call, after the caller has been identified via voice recognition, the GUI element operable to display a listing of names of call participants associated with the collaborative call;
    determining whether the caller is a call host having administrative rights not available to other call participants, said GUI element being a host GUI including advanced call controls when the caller is the call host, the host GUI different than a participant GUI presented to other call participants; and
    updating the GUI element in response to a change in a status of one or more of the call participants, the updating including indicating a desire of a call participant to sneak by displaying an indicator next to the name of the call participant desiring to speak in the listing of names of call participants associated with the collaborative call.

2. The method of claim 1, further comprising:
recognizing that the caller has joined the collaborative call as a call participant; and
presenting a name associated with the caller within the GUI element.

3. The method of claim 1, further comprising:
identifying a participant that is speaking during the collaborative call via voice recognition; and
updating information presented in the GUI element to include the identified participant that is speaking.

4. The method of claim 1, further comprising prompting the caller joining the collaborative call as a call participant to speak in connection with identifying the caller.

5. The method of claim 1, wherein the status of each call participant is selected from a group consisting of an on-call state, an off-call state, a currently speaking state, a waiting to speak state; and a paused-call state.

6. The method of claim 1, further comprising tracking a caller metric for at least one of the call participants, wherein the caller metric is selected from a group consisting of a call joining time, a call exiting time, an on-call duration time, an accepted to-do list, and a participation level indicator.

7. The method of claim 1, further comprising generating a collaborative call report.

8. The method of claim 7, wherein the collaborative call report comprises a list of the call participants and a caller metric for at least one of the call participants.

9. The method of claim 8, wherein the collaborative call report further comprises a transcript of the collaborative call.

10. The method of claim 1, further comprising:
recognizing a subsequent communication by the call participant desiring to speak; and
updating the GUI element to remove the indicator.

11. The method of claim 1, further comprising presenting at least a portion of a transcript of the collaborative call in a textual format within a near real time chat window associated with the GUI element.

12. The method of claim 1, further comprising creating a blog of the collaborative call, wherein the blog comprises at least a portion of a transcript of the collaborative call.

13. The method of claim 1, further comprising:
generating a collaborative call report comprising a list of participants and a transcript of at least a portion of the collaborative call; and
distributing the collaborative call report to at least one call participant.

14. The method of claim 13, wherein distributing the collaborative call report comprises sending a message selected from a group consisting of an electronic mail message, an Instant Message, a facsimile message, and a physical paper message.

15. The method of claim 1, wherein the GUI element comprises an administrative feature icon, the method further comprising:
recognizing that the caller has joined the collaborative call;
determining that the caller is the call host by authenticating credentials received from the caller;
initiating presentation of the GUI element on a display associated with the call host, after the caller is determined to be the call host;
recognizing that a second caller has joined the collaborative call; and
initiating presentation of a second GUI element on a display associated with the second caller by the presentation engine, after the second caller is recognized, wherein the second GUI element does not include the administrative feature icon.

16. The method of claim 1, wherein the GUI element comprises an administrative feature icon operable to trigger termination of a web session associated with the collaborative call, the method further comprising:
recognizing that the caller has joined the collaborative call;
determining that the caller is a call host; and
initiating presentation of the GUI element on a display associated with the call host, after the caller is determined to be the call host.

17. The method of claim 16, further comprising:
receiving a signal indicating activation of the administrative feature icon; and
terminating the web session.

18. A computer-readable medium comprising computer-readable data executable by a processor to:
initiate presentation of a host graphical user interface (GUI) in connection with a collaborative call, the host GUI comprising an administrator icon and a listing of names of call participants associated with the collaborative call, the host GUI providing advanced call controls not available to other call participants;
initiate presentation of a participant GUI having an appearance different than the host GUI by a presentation engine to a device associated with a caller joining in the collaborative call, after the caller has been identified via voice recognition; and
update information presented in the host GUI in response to a change of status of a call participant, the updating including indicating a desire of a call participant to speak next by displaying an indicator next to the name of the call participant desiring to speak in the listing of names of call participants associated with the collaborative call.

19. The computer-readable medium of claim 18, further comprising additional computer-readable data executable by the processor to update participant GUI information presented in response to the change of status of the call participant.

20. The computer-readable medium of claim 18, further comprising additional computer-readable data executable by the processor to:
generate a transcript of the collaborative call; and
initiate communication of the transcript to at least one call participant.

21. The computer-readable medium of claim 18, wherein the status of each call participant is selected from a group consisting of an on-call state, an off-call state, a currently speaking state, a waiting to speak state, and a paused-call state.

22. The computer-readable medium of claim 18, further comprising additional computer-readable data executable by the processor to initiate presentation of a GUI element within the host GUI, the GUI element comprising at least a portion of a transcript of the collaborative call in a textual format.

23. The computer-readable medium of claim 22, wherein the transcript is presented in near real time.

24. A collaborative call system, comprising:
a computing device operable to be communicatively coupled to a remote host station and a remote participant station;

a participant status engine operable to execute on a computing platform and to track a status associated with a corresponding participant of a collaborative call;

a presentation engine associated with the participant status engine, the presentation engine operable to initiate presentation of a first graphical user interface (GUI) on the remote host station associated with a host having administrative rights not available to other call participants, after the host is identified, and a second GUI on the remote participant station associated with a caller, after the caller joining the collaborative call is identified, the first GUI presenting advanced call controls that are not presented by the second GUI and a listing of names of call participants associated with the collaborative call, the caller identified via voice recognition; and a next to speak engine associated with the presentation engine, the next to sneak engine operable to recognize a desire of a call participant to sneak and to initiate presentation of an indicator next to the name of the call participant desiring to sneak in the listing of names of call participants associated with the collaborative call in the first GUI.

25. The system of claim 24, wherein the first GUI comprises a list of call participants and a status icon for each of the participants.

26. The system of claim 24, further comprising a communication engine operable to initiate communication of a call report to the remote host station in response to completion of the collaborative call.

27. The system of claim 24, further comprising an update engine associated with the presentation engine, the update operable to initiate an updating of the first GUI and the second GUI in response to a change in the status of a particular participant.

28. The system of claim 24, further comprising a thin client operable to execute at the remote host station.

29. The system of claim 24, wherein the collaborative call comprises a voice over Internet Protocol (VoIP) call.

30. The system of claim 24, further comprising an interactive voice response (IVR) unit communicatively coupled to the computing platform, the IVR unit operable to allow at least one participant to access information associated with the collaborative call via a voice telephone call.

31. A method comprising:

presenting a host graphical user interface (GUI) element automatically from a presentation engine to a device associated with a caller joining a collaborative call comprising call participants, after the caller has been identified as a host having administrative rights not available to other call participants via voice recognition, the host GUI element operable to display a listing of names of the call participants, the listing including a participant status associated with each of the call participant names, wherein the host GUI element includes advanced call controls that are not presented by a participant GUI presented from the presentation engine to other call participants; and updating the host GUI element in response to a change in the participant status of one of the call participants, the updating including indicating a desire of one of the call participants to sneak by displaying an indicator next to the name of the one of the call participants desiring to speak in the listing of names of call participants associated with the collaborative call;

wherein the participant status is related to activity by the corresponding call participant during the collaborative call.

32. The method of claim 31, further comprising communicating data to a calendar program associated with one of the call participants, wherein the data is communicated via a software package.

33. The method of claim 31, further comprising automatically delivering an audible indication to the call participants when the host begins speaking.

34. The method of claim 31, further comprising automatically delivering an audible announcement to the call participants when one or more of the call participants has left the collaborative call.

35. The method of claim 31, wherein a first call participant participates in the collaborative call via a wireless device and a second participant participates in the collaborative call via Public Switched Telephone Network (PSTN).

36. The method of claim 31, wherein a first call participant participates in the collaborative call via a computer and a second participant participates in the collaborative call via a wireless device or Public Switched Telephone Network (PSTN).

37. The collaborative call system of claim 24, wherein the presentation engine is operable to display one of an image and a portion of a document on at least one of the first GUI and the second GUI during the collaborative call.

* * * * *